Feb. 20, 1951 E. L. FIELD ET AL 2,542,495
IMAGE REDUCTION CIRCUIT
Filed Nov. 19, 1947
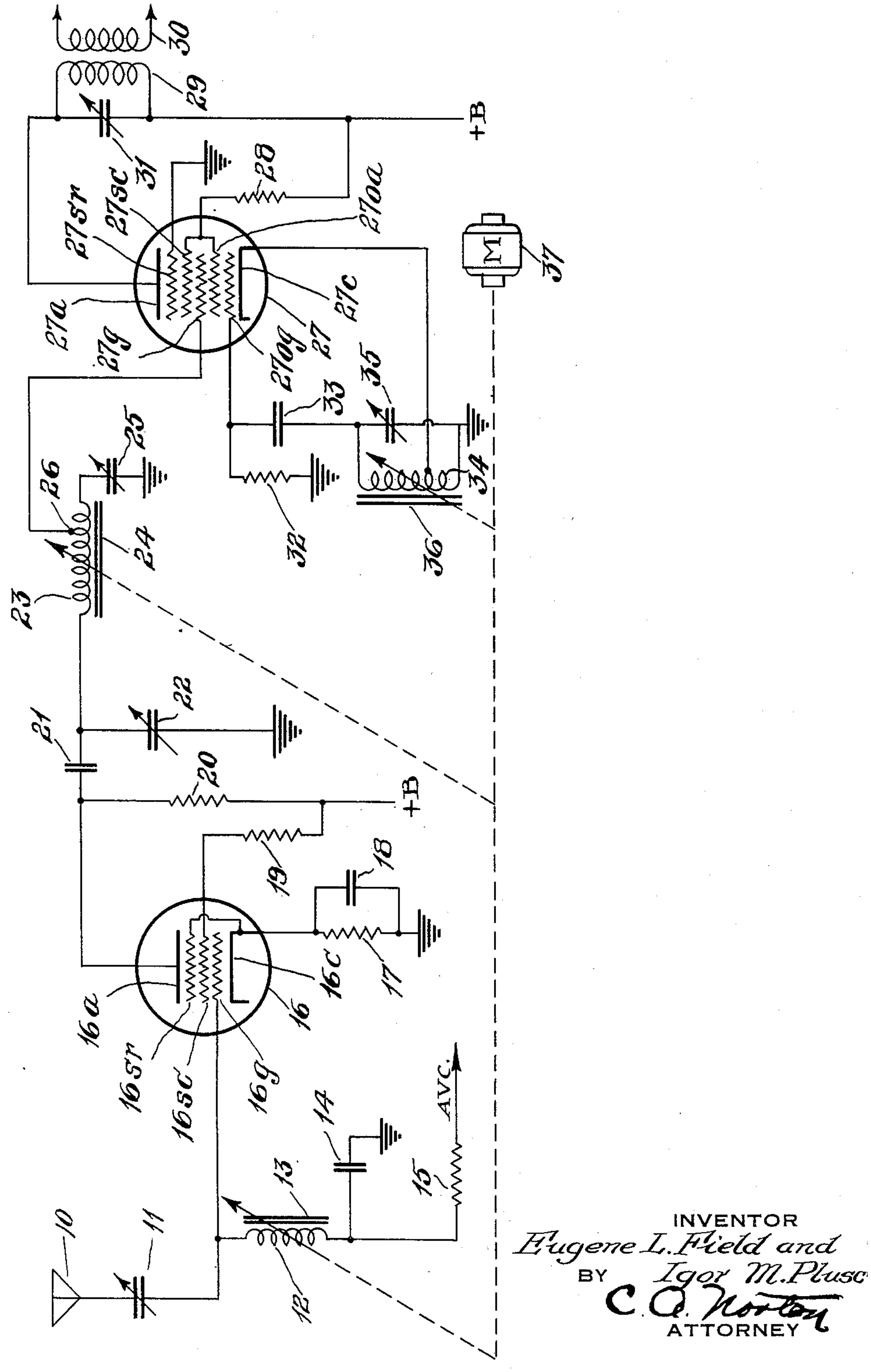
INVENTOR
Eugene L. Field and
Igor M. Plusc
BY C. O. Norton
ATTORNEY Patented Feb. 20, 1951 2,542,495

UNITED STATES PATENT OFFICE 2,542,495

IMAGE REDUCTION CIRCUIT

Eugene L. Field, Buffalo, and Igor M. Plusc, Syracuse, N. Y., assignors, by mesne assignments, to Sylvania Electric Products Inc., New York, N. Y., a corporation of Massachusetts Application November 19, 1947, Serial No. 786,920

6 Claims. (Cl. 250—20)

This invention relates to an image reduction circuit for radio receivers and more particularly, to such a circuit employing permeability tuning. It is well known that permeability tuned receivers are much more difficult to track than capacitively tuned receivers. This is particularly the case where the circuit is used with high frequency.

It is an object of this invention to provide a permeability tuned receiver in which the difficulties of tracking are considerably reduced, and the necessity for the use of coils of high precision is reduced.

It is a further object of the invention to provide a permeability tuned circuit in which changing of the tuning, by adjusting a part of the signal tuning circuit, does not throw off the tuning of the image circuit.

Still other objects and advantages of my invention will be apparent from the specification.

The features of novelty, which we believe to be characteristic of our invention, are set forth with particularity in the appended claims. Our invention itself, however, both as to its fundamental principles and as to its particular embodiments will best be understood by reference to the specification and accompanying drawing, in which the single figure is a circuit diagram of a radio receiver, in accordance with our invention.

In the drawing, 10 designates the antenna of any suitable type. In this particular instance, it may be a so-called whip socket antenna when the receiver is designed for operation in an automobile. The antenna 10 may be connected through a variable condenser 11 and thence through variable inductance 12 and series condenser 14 to ground. The inductance 12 and the input circuit may be tuned by variation of the position of iron core 13, well known in the art. The connection of inductance 12 and condenser 14 may be connected through resistor 15 to the AVC circuit in the usual manner, and since such circuits are well known in the art and are, per se, not part of our invention, they are not shown in detail.

The first tuned circuit feeds the input circuit of tube 16, which may be a pentode having cathode 16*c*, control electrode 16*g*, screen grid 16*sc*, suppressor grid 16*sr*, and anode 16*a*. The cathode may be connected through resistor 17, shunted by by-pass condenser 18, to ground. The control electrode 16*sc* may be connected to the common terminal of condenser 11, and inductance 12. The suppressor 16*sr* may be connected to cathode and the screen, and anode 16*sc* and 16*a*, are respectively connected through resistors 19 and 20 to plus B, the negative side of which is grounded.

The output of tube 16 is fed to the input of the next stage, in this instance through coupling condenser 21. The tuned circuit interposed between tube 16 and the following tube in this instance is formed by variable condenser 22, variable inductance 23, and variable condenser 25, all in series, with the condensers 22 and 25 connected on one side to ground. Inductance 23 is tuned by variation of iron core 24, which may be ganged with core 13.

Tube 27 is illustrated as a tube of the pentagrid converter type and operates as will be understood to generate the local oscillation used to beat with the incoming signal. The beat currents are then detected and supplied to the intermediate frequency amplifier. The tube 27 may contain cathode 27*c*, oscillator grid 27*og*, control grid 27*g*, screen grid 27*sg*, and anode 27. The control grid 27*g* is connected to an intermediate point on inductance 23, the point at which connection is made being chosen in accordance with the principles to be described hereafter.

Cathode 27*c* is connected at an intermediate point on inductance 34, the oscillator tank coil, the lower end of which is connected to ground, and the upper end of which is connected through condenser 33 to the oscillator grid 27*og*, from which resistance 32 may be connected to ground. Trimmer condenser 35 may be connected in parallel with inductance 34 and inductance 34 may be tuned by movement of the iron core 36. Screen grid 27*sc* may be connected through a resistor 28 to plus B and suppressor 27*sr* may be connected to ground. Anode 27*a* is connected to one terminal of IF transformer winding 29, the opposite terminal of which is connected to plus B, and winding 29 may be shunted by trimmer condenser 31. The secondary coil 30 of the IF transformer supplies intermediate frequency currents which may be further amplified, detected, again amplified, and supplied to a loud speaker. Since the circuits following the first IF transformer are well known in the art and form, per se, no part of my invention, they are not shown or described in detail.

Tuning may be accomplished by tuning drive 37, herein indicated as a motor, although it will be understood that any other form of drive may be applied to the tuner, such as a manual drive, push buttons, or the like.

In the adjustment and operation of the receiver in accordance with my invention, the portion of inductance 23 from tap point 26 to the connection with condenser 25 is chosen of such a value as to resonate with condenser 25 at the image frequency. When this adjustment has been made, the tracking can be performed by adjustment of trimmer condenser 22, without seriously upsetting the tuning of the image rejector circuit formed by the right end portion of inductance 24 and condenser 25 in series. As the signal is tuned by operation of the tuner drive 37, the resonant frequency of the image trap tends to follow the image frequency which; as is well known, is always signal frequency plus or minus twice the intermediate frequency.

With the image trap series tuned to the image frequency at signal frequency of 1000 (image 1520 kc.), the value of reactance for condenser 25 was 800 ohms, the value of reactance of trap portion of inductance 23, 800 ohms, and $Z=O$. At 1000 kc. the respective values were 1300 ohms, 550 ohms, and $Z=J750$ ohms. With signal at 1400 kc., image at 1920 kc., the value of reactance of condenser 25 was 870 ohms, that of the trap portion of inductance 23, 370 ohms, and Z was $-J500$ ohms. At 1920 kc., the values were respectively, 640, 520 and $-J120$ ohms. At 600 kc., the values were 2000, 900 and $-J1100$ ohms. At 1120 kc. the values were 1200, 700 and J500 ohms. The image improvement at 1000 kc. was, therefore, infinite. At 1400 kc., approximately 5 to 1 and at 600 kc. approximately 2 to 1. It is noted that there was also improvement in intermediate frequency rejection with the circuit shown and described.

While we have shown and described certain preferred embodiments of our invention, it will be understood that modifications and changes may be made without departing from the spirit and scope thereof, as will be clear to those skilled in the art.

In the specification we have explained the principles of our invention and the best mode in which we have contemplated applying those principles, so as to distinguish our invention from other inventions, and we have particularly pointed out and distinctly claimed the part, improvement, or combination which we claim as our invention or discovery.

We claim:

1. In a superheterodyne receiver, in image reducing system comprising, in combination, an inductance, a movable core for tuning the same to desired signals, a variable condenser connected from one end of said inductance to ground, a substantially zero reactance connection from an intermediate point on said inductance to the grid of an electron discharge tube, and a second variable condenser connected from the other end of said inductance to ground, the position of said intermediate point and the value of said second condenser being so chosen that the path from said point through said second condenser to ground is series resonant to the image frequency for some value of signal frequency within the tuning range.

2. In a superheterodyne receiver, an image reducing system comprising, in combination, an inductance, a movable core for tuning the same to desired signals, a variable condenser connected from one end of said inductance to ground, a substantially zero reactance connection from an intermediate point on said inductance to the grid of an electron discharge tube, and a second variable condenser connected from the other end of said inductance to ground, the position of said intermediate point and the value of said second condenser being so chosen that the path from said point through said second condenser to ground is series resonant to the image frequency when the receiver is tuned to 1000 kilocycles.

3. An image reducing, frequency selecting coupling circuit for coupling tubes in a superheterodyne receiver, comprising an inductance, means for connecting one terminal of said inductance to the output circuit of a preceding tube and to ground through a variable condenser, means for connecting the other terminal to ground through a second variable condenser, and means substantially free of reactance for connecting an intermediate point on said inductance to the grid of a following tube, and means for varying said inductance to select desired signals, the path from said intermediate point to ground through said second condenser being series resonant at image frequency for some value of signal frequency within the tuning range.

4. An image reducing, frequency selecting coupling circuit for coupling tubes in a superheterodyne receiver, comprising an inductance, means for connecting one terminal of said inductance to the output circuit of a preceding tube and to ground through a variable condenser, means for connecting the other terminal to ground through a second variable condenser, and means substantially free of reactance for connecting an intermediate point on said inductance to the grid of a following tube, and means for varying said inudctance to select desired signals, the path from said intermediate point to ground through said second condenser being series resonant at image frequency when the receiver is tuned to 1000 kilocycles.

5. An image reducing frequency selecting coupling circuit for coupling tubes in a superheterodyne receiver, comprising an inductance, a connection from one terminal thereof to the output circuit of a preceding tube and to ground through a trimmer condenser, a connection from the other terminal of said inductance to ground through a second trimmer condenser, and a connection having substantially zero reactance from an intermediate point to the grid of a following tube, and means for varying said inductance to select desired signals, the position of said intermediate point and the value of said second trimmer condenser being such that the path from said point to ground through said second condenser is series resonant at image frequency for some value of signal frequency within the tuning range.

6. An image reducing frequency selecting coupling circuit for coupling tubes in a superheterodyne receiver, comprising an inductance, a connection from one terminal thereof to the output circuit of a preceding tube and to ground through a trimmer condenser, a connection from the other terminal of said inductance to ground through a second trimmer condenser, and a connection having substantially zero reactance from an intermediate point to the grid of a following tube, and means for varying said inductance to select desired signals, the position of said intermediate point and the value of said second trimmer condenser being such that the path from said point to ground through said second condenser is series resonant at image frequency when the receiver is tuned to 1000 kilocycles.

EUGENE L. FIELD.
IGOR M. PLUSC.

REFERENCES CITED

The following references are of record in the file of this patent:

UNITED STATES PATENTS

| Number | Name | Date |
|---|---|---|
| 2,131,976 | Schaper | Oct. 4, 1938 |
| 2,196,266 | Landon et al. | Apr. 9, 1940 |
| 2,252,609 | Beck | Aug. 12, 1941 |
| 2,256,277 | Cutting | Sept. 16, 1941 |
| 2,281,661 | Barton | May 5, 1942 |
| 2,334,670 | De Cola | Nov. 16, 1943 |
| 2,419,882 | Bradley | Apr. 29, 1947 |
| 2,453,081 | Sziklai | Nov. 2, 1948 |